July 25, 1961 W. W. HANSEN 2,994,032
INSPECTION SYSTEM AND METHOD
Filed May 28, 1957 2 Sheets-Sheet 1
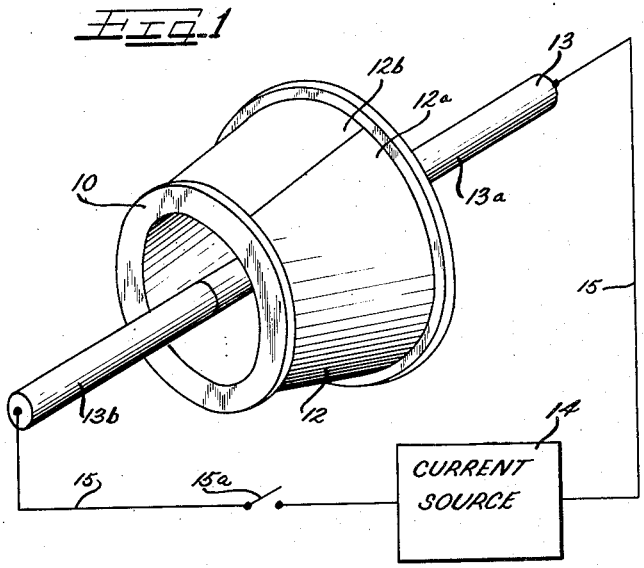
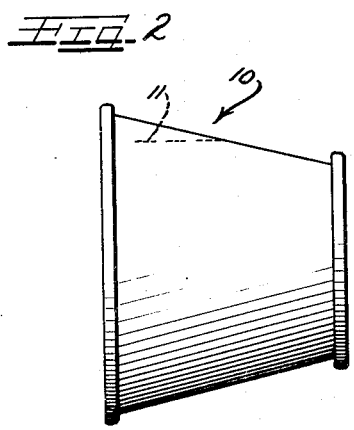
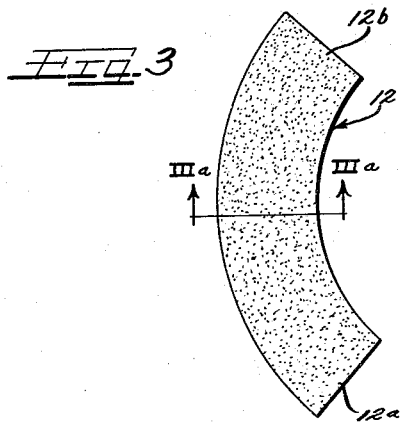
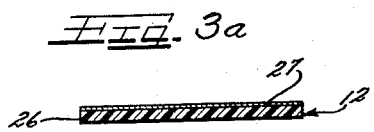
Inventor
WILBUR W. HANSEN
By Hill, Sherman, Meroni, Gross + Simpson
Attys

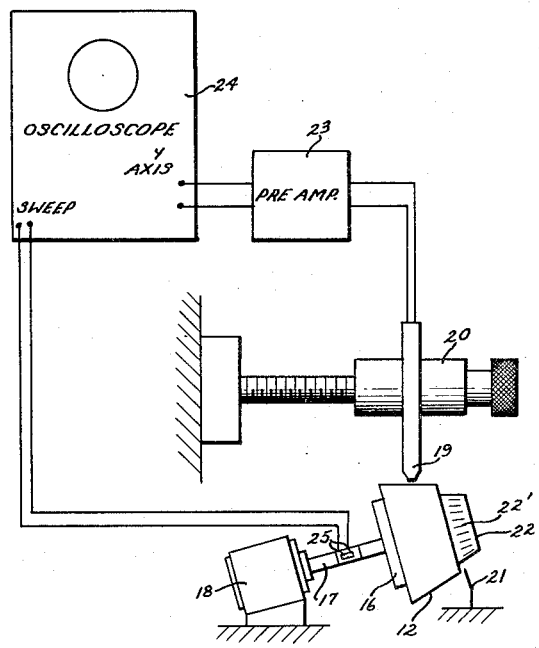
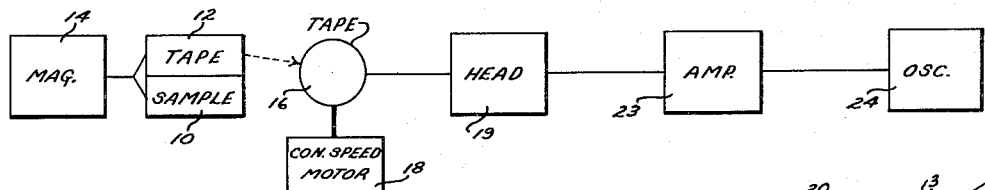
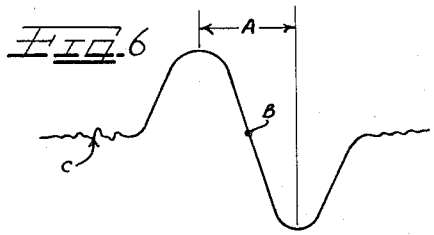
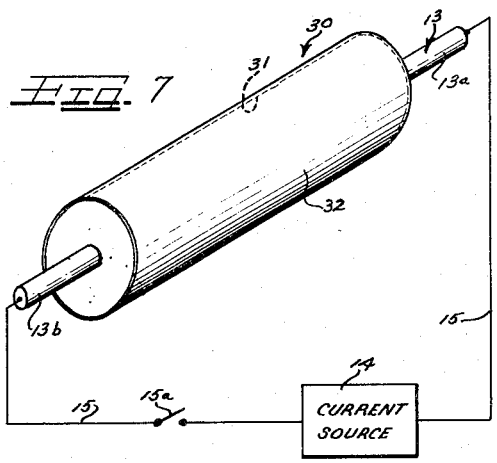
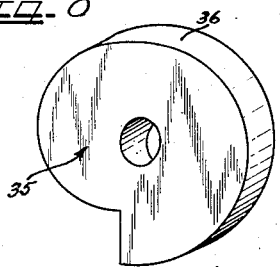

United States Patent Office 2,994,032
Patented July 25, 1961

2,994,032
INSPECTION SYSTEM AND METHOD
Wilbur W. Hansen, Menlo Park, Calif., assignor to Armour Research Foundation of Illinois Institute of Technology, Chicago, Ill., a corporation of Illinois
Filed May 28, 1957, Ser. No. 662,138
15 Claims. (Cl. 324—37)

This invention relates to a method and means for detecting discontinuities and more particularly to a method and means of discontinuity detection by which an indication of discontinuities in an article under test is obtained from a member independent of the article under test.

Certain limitations exist in connection with known inspection methods which have been solved by the herein described method and means of testing. The method and apparatus may be used with variously shaped parts. Accordingly, references herein to specific forms, for example bearings, are made for the purpose of illustration, and not by way of limitation.

Past experience has indicated that the majority of fatigue failures in various machine components such as roller bearings probably result from surface and sub-surface abnormalities, particularly inclusions in the steel from which the bearing cones or other parts are made. It also appears that certain types of inclusions are more likely to cause failure than are other types. The experimental data obtained to date, however, are not sufficient to provide a definite correlation between inclusion characteristics and bearing failure. A major difficulty in testing or in inspecting various parts is in accurately locating and classifying sub-surface defects before fatigue tests are started.

I have invented a method and apparatus for the inspection of articles wherein a member having uniformly distributed magnetizable material therein, preferably commercially available magnetic recording tape having an iron oxide coating on one side thereof, is placed on a surface, such as a frusto-conical surface, of the article to be tested for surface and sub-surface discontinuities. Thereafter, a circular magnetic flux is induced in the article and in the coating. The magnetic flux is generally uniform over the surface portion of the article and of the coating, except as distorted by discontinuities in the article, and the flux pattern at the surface portion of the article is transferred to the tape by permanent magnetization of the magnetizable material therein. The tape may then be removed from the article and mounted on a non-magnetic member typically having a shape similar to the inspected article. In certain embodiments, the member is then rotated at a constant speed. A magnetic recording head having a small sensing area is then used to transform variations in the magnetic field of the tape into electrical impulses obtained along a series of perimetral lines, thereby producing an intelligence, for example, a display preferably on a cathode ray oscilloscope. I have also found it desirable to provide amplification of the signal or intelligence from the magnetic head using a preamplifier, such as a transistorized amplifier. This invention provides a highly accurate permanent record of the various defects in the article and of its surface finish, which may be used for various purposes, for example, rejection of the article, classification of discontinuities for correlation with other facts, and the like.

A primary objective of this invention, therefore, is the provision of a method and means capable of locating and of providing information for use in classifying discontinuities in ferromagnetic material.

Destructive tests have indicated that extremely small inclusions or abnormalities cannot be visually detected by known magnetic particle inspection apparatus. Further, when round or cylindrical objects, and in particular conical objects are being examined, the configuration of the objects provides further problems in locating the discontinuity.

Accordingly, another primary objective of this invention is to provide a method and means of detecting discontinuities which are smaller and/or more remote from the surface than are discontinuities which have heretofore been detectable by non-destructive methods.

Another object of this invention is to provide a novel surface finish gage.

Still another object of this invention is the provision of a medium in which information relating to discontinuities in an article is stored.

Yet another object is the provision of apparatus for locating the discontinuities lying in or below a conical surface.

A still further object of this invention is the provision of a method and means whereby abnormalities in a ferromagnetic article may be detected and evaluated, such method or means including the use of commercially available style of magnetic recording tape.

Yet another object is the provision of a method for detecting and/or displaying discontinuities without damage to the article being evaluated.

Other objects, features and advantages of the instant invention will be apparent from the following detailed description of the attached sheets of drawings, which illustrate the invention.

On the drawings:

FIGURE 1 is a schematic view of the means or method for inducing a field in an article and in the tape member;

FIGURE 2 is an elevational view of a frusto-conical article to be inspected;

FIGURE 3 is a development of the magnetic member or tape used in FIGURE 1, but drawn with a reduced scale, and showing how it is contoured to be used with the article of FIGURE 2;

FIGURE 3a is a sectional view along line IIIa—IIIa of FIGURE 3, scaled per FIGURE 2, but with thickness exaggerated for clarity;

FIGURE 4 is a schematic view of the assembly for use in transforming variations in the magnetic field of the tape into electrical impulses;

FIGURE 5 is a block flow diagram of the method utilized for detecting and analyzing discontinuities;

FIGURE 6 is a representative oscillogram of a recorded discontinuity;

FIGURE 7 illustrates an arrangement for inducing a field in an article of solid configuration; and FIGURE 8 illustrates a still further configuration which may be tested according to this invention.

As shown on the drawings:

Referring to FIGURE 1, numeral 10 indicates an article or bearing cone which may be tested by the method and means of this invention. The article 10 to be tested may be of any electrically conducting material whether magnetic or non-magnetic, but the method and means of this invention are peculiarly and particularly advantageous with test articles of magnetizable material, such as are denoted as being ferro-magnetic. This method is adaptable to any shaped article, for example, articles having frusto-conical or conical surfaces, cams, articles having irregular surfaces, and articles having a surface of revolution.

Referring to FIGURE 2, the article 10 is shown as having a sub-surface discontinuity, flaw, defect, or inclusion 11, the discontinuity 11 being exaggerated in size. The detection, according to this invention of sub-surface discontinuities 11 having a diameter smaller than is detectable by magnetic particle inspection, has been verified. Further, discontinuities 11 positioned below the surface such a distance as to render them undetectable by magnetic particle inspection have been located by this invention and verified by destructive tests.

Discontinuities such as the stringer 11, are formed primarily during the cooling of the molten steel or other material when oxygen which is freed from solution combines with any deoxidizers present. During subsequent forming, any inclusions present are generally elongated. Consequently, the raw stock has inclusions which are generally continuous or broken running nearly longitudinally along the tubing or bar and parallel to the surface. In the finished product (for example a bearing cone), they generally run parallel to the original surface of the tube or bar and at an angle to any finished conical surface. The discontinuity 11 may not extend through the surface, but if it does, it would appear only as a microscopic spot. Of course, any surface discontinuity or irregularity can also be detected by this method, but such can be distinguished from sub-surface discontinuities by optical methods.

To prepare the article 10 for examination, a piece of conventional magnetic recording tape 12, such as sold under the trademark "Scotch Brand Type 111" or equivalent, may, by way of illustration, be cut to form a strip having a length slightly exceeding the length of the portion of the article to be tested. Tape 12, such as that identified, has a magnetic oxide coating or layer 27 on the order of .0005 inch and is available in strip form. Preferably the width should be greater than the area to be inspected or tested so that the desired shape, even if irregular, may be cut therefrom.

The ends 12a and 12b of the tape 12 are brought into any one of spaced, confronting or overlapping relation with each other when the tape 12 is placed onto the article 10. It is preferable that the oxide coating 27 of the magnetic tape 12 be placed adjacent to the surface of the article 10. However, as is explained below, placing the oxide coating 27 away from the article 10 or outermost in certain circumstances may be preferable.

With the placing of the tape 12 on the article 10, and securing it thereto by any convenient means, the article 10 is then ready for the next step. Referring to FIGURE 1, the article is shown at a magnetizing station. For ease of magnetization of various samples, it is preferable that a rod 13, for example of copper, be inserted against the article 10 or through an axial opening in the article. For convenience, the rod 13 may be shaped in such a way as to support the article 10. The rod 13 may be made of two components 13a and 13b which telescope together physically, and which provide an electrical path through the article or core 10 or through the opening in the article. The ends of the rod 13 are electrically connected to a current source 14 by a pair of leads 15, 15. While I have found that pulse and alternating types of current sources will produce operative results, the best results are obtained when a source of continuous direct current is utilized. The switch 15a is closed for a period of two to five seconds whereby the maximum disturbance of the magnetic field distribution is obtained, the field lines being transverse to the major axis of the discontinuity. Thus, the field applied to the sample will frequently be transverse or circumferential and not axial since the inclusions 11 tend to have an axial orientation. Of course, the field should not be allowed to reverse. With circular magnetization, there is no air gap in the magnetic circuit, thereby eliminating one variable in the testing process; the entire surface of the sample is put under the influence of the induced field, and likewise the tape 12 is recorded in a single operation. The optimum surface magnetic field for tape transfer inspection was obtained using about 350 ampere-turns per inch of path length in the magnetic circuits. Thus, for a sample one inch in diameter the surface path length is 3.14 inches approximately, and the magnetomotive force required is approximately 1100 ampere-turns. For samples of greater diameter, a correspondingly greater magnetomotive force is required.

It is to be understood that while the rod 13 has been shown in a concentric relationship with respect to the article 10, this relationship is not essential. For a given configuration of article, the ideal relative position of the rod with respect to the article is best determined empirically to obtain an optimum flux density for thereby producing a maximum signal-to-noise ratio. Thus, the magnetizing conditions may be selected to produce a preferred threshhold for cutting off signals below a given level, whereby any discontinuities below a selected size and/or depth may be disregarded.

After the tape 12 has thus been magnetized permanently, it is removed from the article 10 and mounted on a nonmagnetic adaptor plug or member 16, as shown in FIGURE 4. The adaptor plug 16 may have a configuration similar to the article being tested so that the recorded tape 12 may be placed thereon in a fashion identical to that in which it was carried during the recording. The plug 16 is driven by the shaft 17 of a constant speed motor 18. A magnetic pickup head 19 having a narrow face is mounted adjacent to the tape 12. Where a discontinuity 11 is present in the sample 10, there is a magnetic variation in the tape which assumes the properties of a magnetic dipole. The dipole, in passing by the gap in the magnetic head 19, changes the flux linking the head coil thereof and induces voltage in the coil. For maximum resolution, the magnetic head 19 should have as narrow a track width as possible. Further, the magnetic gap in the face of the head should also be narrow. The magnetic head 19 may be carried on a horizontal calibrated screw 20. In this way, screw position readings may be taken as an index or guide to the precise location of magnetic variations, and hence discontinuities which may be present. If desired, a fixed calibration reference point or plate 21 may also be provided adjacent to the front of the adaptor plug 16. Further, a plurality of angular calibration marks 22' may also be provided on a selector knob 22, if desired. The knob 22 is rotatable with a pair of synchronizing contacts 25, 25, and is adjustable angularly with respect to the plug 16. Thus, the knob 22 may be used in conjunction with the horizontal calibration screw 20 for angularly locating any magnetic variation caused by the discontinuity. The pickup head 19 is connected to a preamplifier 23, which is preferably of transistorized construction to avoid microphonics. The signal from the preamplifier 23 in turn is displayed on an oscilloscope 24. In order to obtain a standing display on the scope 24, it is preferable to initiate the sweep circuit of the scope by means of the pair of contacts 25, 25 typically rotated or actuated by the shaft 17.

When an object has a surface to be analyzed or inspected which extends for 360°, the ends of the tape may produce an electrical indication. If there be a discontinuity immediately below the end of the tape, an erroneous conclusion could be reached. This can be avoided by use of a continuous tape of belt form. Accordingly, it is preferable, when it is necessary for the magnetic head 19 to scan across the ends of the tape 12a, 12b, to use two tapes, magnetizing and analyzing them successively. One of these tapes extends for over 180°, while the second tape overlaps the points to which the ends of the first extended. The successive use of tapes, each extending about 200° has been found to be quite satisfactory.

FIGURE 5 summarizes the foregoing basic steps, and shows that a magnetic field is induced in the sample 10 and in the recording medium 12, after which the recording medium 12 is rotated with respect to the magnetic head 19. Any signal generated in the head 19 is thereafter amplified and displayed on the oscilloscope 24. While the invention has been illustrated as including rotation of the tape 12 with respect to the head 19 during analysis, it is to be understood that an equivalent result is obtained by relatively moving the head with respect to the tape. This is particularly true when large sections are being inspected and evaluated. Further the relative movement between the head and the tape may also be translational as well as rotational.

FIGURE 6 shows a representative pulse as produced by a discontinuity and displayed on the scope 24. Work with samples containing natural and artificial inclusions at various depths shows that the width of observed pulses, indicated in FIGURE 6 by the distance A, is a direct function or indication of the depth of the inclusion 11, and a measurement of such depth, if the scope 24 was calibrated. This is true for a given range of inclusion diameters. Point B on FIGURE 6 indicates the condition or display which is present when the magnetic pickup 19 is directly above the inclusion 11. To determine the exact angular location of point B on the tape and hence in the article, the knob 22 and the synchronizing contacts 25, 25 are adjusted angularly with respect to the plug 16 and the tape 12 until point B is at the start of the trace. The peak of the magnetic variation is now directly in line with the head 19, and the position of the marks 22' with respect to the index 21 may now be noted, and is an indication of the angular location of the discontinuity in the article. A high frequency noise or signal, shown at C, has been shown by experimentation to be due to surface conditions, for example a scratch on a highly finished surface. It has also been shown that if the tape 12 be applied so that the oxide coating 27 is outward during the magnetizing, it may then be played back with the oxide coating 27 either adjacent to or remote from the pickup head 19 with the surface noise signals C being reduced, the tape base 26 acting as a filter or shim. Normally, however, it is considered preferable to have the oxide coating 27 adjacent to the article to be examined during the magnetization and adjacent to the pickup head during the subsequent sensing for magnetic variations. However, it must be recognized that high frequency signals produced by minute or deep inclusions 11 may have a strength or length similar to that of the noise shown at C. Thus, if an optical examination of the surface of the article 10 shows it to be polished smoothly without surface scratches, such signals as shown at C indicate subsurface discontinuities. It may be seen that where a stringer 11 is not parallel to the surface, the pulse width A will increase or decrease for various settings of the calibration screw 20. Thus, axial and circumferential location of discontinuities can be read directly on the various dials and pulse width may be used to indicate or measure the depth.

Thus, the field at the surface of the sample 10 is transferred to a tape member 12, converted to a voltage by use of a magnetic field sensing head 19, amplified and presented visually on a display device such as a cathode ray oscilloscope 24.

Calibration of the cathode ray oscilloscope 24 is simple and is accomplished in acocrdance with conventional procedures. Once the oscilloscope 24 is calibrated using a known standard, certain other variables are held constant. These include the magnitude, time duration and directional orientation of the applied magnetic field. The various operating characteristics of the analyzing unit comprising all of the subject matter of FIGURE 4 and including the electronic amplifier 23 and indicator 24 are, of course, nullified by calibration.

It is to be understood that the instant invention is not to be limited to articles having a configuration in accordance with FIGURE 2. FIGURE 7 illustrates an article 30 having a surface 31 against which a suitably shaped tape 32 may be applied. The article 30 has ends against which the rod 13 may bear. When so used, the rod components 13a and 13b, being separable, may bear on the opposite ends of the article. Of course, the rod components 13a and 13b, being telescopic, may also extend through an opening in the article, if there be one, in the manner illustrated in FIGURE 1. When a magnetizing field has been applied to the tape 12 and the sample 30, the tape may be transferred to the apparatus of FIGURE 4, for analysis, an adapter being provided having the configuration of the article 30 in place of the adapter 16.

Furthermore, the article to be tested may have an irregular contour such as the cam 35, shown in FIGURE 8. A tape may be applied to the cam 35 to extend around its perimetral face 36 or a portion thereof for the recording step. In place of adapter 16, an adapter is provided which has an arcuate tape supporting surface, and which is rotated about its axis. Therefore, several tapes may be applied to a complex shaped articles, for example a crankshaft, for the recording step.

Thus, the method and means of inspecting taught herein include the impressing of a discontinuity-produced magnetic pattern on a magnetic tape, which is thereafter electro-magnetically scanned to produce an intelligence. Several advantages exist when tape is used, as in this invention. (1) Many materials from which articles may be made have less than ideal magnetic properties. The ferromagnetic coating on the tape is selected both for its magnetic permeability and for its high residual flux density, without regard to the other physical properties which must be considered in selecting the material from which the article is to be made. (2) By use of tape, the basic information may be retained on a record. (3) The record so retained need not be erased, but can be easily stored. (4) The record need not be disposed of when it has served its purpose in storage, but may be erased and reused. (5) Tape being flexible, it can be used with any shape of object whereon a strip of tape may be laid. Preferably substantially non-resilient flexible tape is used so that accurate information as to location of the discontinuity may be obtained. Where this information is of secondary importance, resilient tape may be employed and formed adjacent to surfaces more complex than can be overlaid by flexible non-resilient strips. (6) When the tape is removed and separately analyzed, the field-diffusing effect caused by the articles is avoided, thereby enabling more precise analysis. (7) A quantitative analysis of the discontinuity is obtainable.

It will also be understood that modifications and variations may be effected without departing from the spirit and scope of the novel concepts of the present invention.

I claim as my invention:

1. In a method of inspecting conductive ferromagnetic objects for the presence of surface and sub-surface discontinuities, the steps of: providing a substantially uniform layer of magnetizable material; positioning said layer of material in close proximity with the surface of an object to be inspected; producing magnetic flux in the object and in the layer of magnetizable material; positioning electromagnetic pick-up and indicating means in operative relationship with the magnetizable layer; and causing relative transverse movement between said layer and the pickup and indicating means to induce an electrical signal, whereby in response to signal variation, the pickup and indicator means indicates the presence of changes in the magnetization of the layer.

2. In a method of inspecting conductive ferromagnetic objects for the presence of surface and sub-surface discontinuities, the steps of: providing a substantially uniform layer of magnetizable material; positioning said layer of material in close proximity with the surface of an object to be inspected; producing magnetic flux in the object and in the layer of magnetizable material; removing the layer from the object and positioning the layer on a non-electromagnetic adapter; positioning magnetic pick-up and indicating means in operative relationship with the magnetizable layer; and causing relative transverse movement between said layer and the pickup and indicating means to induce an electrical signal, whereby in response to signal variation, the pickup and indicator means indicates the presence of changes in the magnetization of the layer.

3. In a method of inspecting conductive ferromagnetic objects for the presence of surface and subsurface discontinuities, the steps of: providing a flexible tape containing a substantially uniform layer of magnetizable material; positioning the tape in contact with the surface of the object to be inspected; producing magnetic flux in the object and in the layer of magnetizable material; removing the tape from the object and positioning the tape on a nonmagnetic adapter; positioning electromagnetic pick-up and indicating means in operative relationship with the tape; and causing relative transverse movement between the tape and the pickup and indicating means to induce an electrical signal, whereby in response to signal variation, the pickup and indicator means indicates the presence of changes in the magnetizable layer.

4. Inspection apparatus for detecting and indicating the location of surface and subsurface discontinuities in conductive ferromagnetic objects, comprising in combination: a tape containing a substantially uniform layer of magnetizable material adapted to be placed in contact with the surface of an object to be inspected; means for inducing magnetic flux in the object and in the magnetizable layer; electromagnetic pick-up and indicating means adapted to be positioned in operative relationship with the tape after the layer has been magnetized; and means for causing relative transverse movement between the tape and the pick-up means to induce a signal in the pick-up means.

5. Inspection apparatus for detecting and indicating the location of surface and subsurface discontinuities in conductive ferromagnetic objects, comprising in combination: a tape containing a substantially uniform layer of magnetizable material adapted to be placed in contact with the surface of an object to be inspected; means for inducing magnetic flux in the object and in the magnetizable layer; a non-magnetic adapter for receiving the tape after magnetization; electromagnetic pick-up and indicating means adapted to be positioned in operative relationship with the tape on the adapter; and means for causing relative transverse movement between the tape and the pick-up means to induce a signal in the pick-up means.

6. Inspection apparatus for detecting and indicating the location of surface and subsurface discontinuities in conductive ferromagnetic objects, comprising in combination: a tape containing a substantially uniform layer of magnetizable material adapted to be placed in contact with the surface of an object to be inspected; means for inducing magnetic flux in the object and in the magnetizable layer; a non-magnetic adapter for receiving the tape after magnetization; means for rotating the adapter and the tape; electromagnetic pick-up and indicating means adapted to be positioned in operative relationship with the tape on the adapter and operative in response to rotation of the tape; and means for moving the magnetic pick-up means axially relative to the adapter during rotation thereof.

7. Apparatus for testing a conductive ferromagnetic article for discontinuities comprising: a member having permanently uniformly distributed magnetizable material therein and supported by the article with a surface portion thereof proximate a surface portion of the article; means for inducing a magnetic flux in the article and in said member substantially uniformly over said surface portions except as distorted by discontinuities in said article; and means for indicating any discontinuities in said article, said means including means rotating said member, and an electromagnetic head arranged sensingly adjacent to said surface portion of said member and responsive to rotation thereof.

8. Apparatus for testing a conductive ferromagnetic article, said article having a section defining a frustro-conical circumferential surface, for discontinuities at and below said surface, comprising: a tape having a magnetizable oxide coating, said coating being permanently uniformly distributed on one side thereof and fixedly supported with said coating contactingly surrounding said surface; means for inducing a circular magnetic flux in the article and in said coating substantially uniformly over said surface and said coating except as distorted by discontinuities in said article; and means for indicating any defects, said means including means rotating said tape after its removal from said surface, and an electromagnetic head sensingly adjacent to said tape and responsive to the rotation thereof.

9. Apparatus for testing a conductive ferromagnetic article, said article having a section defining a frustro-conical circumferential surface, for discontinuities at and below said surface, comprising: a tape having a magnetizable oxide coating, said coating being permanently uniformly distributed on one side thereof and fixedly supported with said coating contactingly surrounding said surface; means for inducing a circular magnetic flux in the article and in said coating substantially uniformly over said surface and said coating except as distorted by discontinuities in said article; and means for indicating any discontinuities, said means including means rotating said tape after its removal from said article, an electromagnetic head sensingly adjacent to said tape and responsive to the rotation thereof for sensing any magnetic variations in said tape, and an amplifier and cathode ray oscilloscope connected to said head for displaying any such magnetic variation, thereby displaying any discontinuity in the article.

10. A method of testing a conductive ferromagnetic article for discontinuities, comprising the steps of: providing a member having permanently uniformly distributed magnetizable material therein; disposing said member over a surface portion of the article; inducing a circular magnetic flux in said article and in said member; and indicating any discontinuities in said article by continually cyclically rotating said magnetized member adjacent to an inductive magnetic pick-up electrically connected to a display means, whereby a persisting electrical indication of any discontinuity is obtained.

11. Apparatus for testing a conductive ferromagnetic body, having a perimetral surface portion, for discontinuities at and below the surface portion comprising: a tape having a magnetizable coating, said coating being permanently uniformly distributed on one side thereof and fixedly supported surrounding the surface portion; means for inducing a circular magnetic flux in the body and in said coating substantially uniformly over the surface portion and said coating except as distorted by discontinuities in the body; and means for indicating any discontinuities in the body, said means including rotating means for rotating said tape after its removal from the body, an electromagnetic head sensingly adjacent to said tape and responsive to the rotation thereof for sensing any magnetic variations, an amplifier and a cathode ray oscilloscope connected to said head for displaying any such magnetic variation, thereby displaying any discontinuity in the body, and means responsive to the rotation of said rotating means and operative to synchronize the sweep of said oscilloscope with said rotation, thereby rendering the electrical display of any discontinuity persistent.

12. Apparatus for testing a conductive ferromagnetic body, having a perimetral surface portion, for discontinuities at and below said surface portion comprising: a tape having a magnetizable coating, said coating being permanently uniformly distributed on one side thereof and fixedly supported surrounding said surface portion; means for inducing a circular magnetic flux in the body and in said coating substantially uniformly over said surface portion and said coating except as distorted by discontinuities in said body; and means for indicating any discontinuities in the body, said means including a rotatably supported non-magnetic plug having a configuration similar to said surface for supporting said tape after its removal from the body, means for rotating said plug and said tape, an electromagnetic head sensingly adjacent to said tape and responsive to the rotation thereof for sensing any magnetic variations produced by any discontinuities, and means connected to said electromagnetic head for electrically displaying any such magnetic variation, thereby displaying any discontinuity in said body.

13. In an apparatus for testing a conductive ferromagnetic body, said body having an irregularly contoured surface, for defects at and below said surface, the improvement comprising: a non-resilient tape having a permanently uniformly distributed magnetizable material therein and supported by said body proximately to said irregular surface; means for inducing a magnetic flux in the body and in said tape substantially uniformly over said surface except as distorted by discontinuities in said body; and means for indicating any discontinuities, said means including a non-magnetic member having an arcuate tape-supporting surface, means for rotating said member and said tape after its removal from said body, and means for electrically sensing any magnetic variations in the tape to thereby indicate a discontinuity.

14. A method of testing an irregularly contoured conductive ferromagnetic article for discontinuities, comprising the steps of: disposing at least one flexible non-resilient member having permanently uniformly distributed magnetizable material thereon on the irregular contour of the article; inducing a circular magnetic field in said article and said member; imparting an arcuate form to said member; rotating said member about its axis; and simultaneously with said rotation, sensing and indicating any magnetic variations in said member to thereby reveal discontinuities in the article.

15. Apparatus for testing a conductive ferromagnetic article for discontinuities comprising: a member having permanently uniformly distributed magnetizable material therein and supported by the article with a surface portion thereof proximate a surface portion of the article; means for inducing a magnetic flux in the article and in said member substantially uniformly over said surface portions except as distorted by discontinuities in said article; and means for indicating any discontinuities in said article, said means including a sensing and indicating means disposed sensingly adjacent to said member and responsive to relative movement with respect to said member, said means being operative to indicate the presence of changes in the magnetization of said material in said member.

References Cited in the file of this patent

UNITED STATES PATENTS

| | | |
|---|---|---|
| 2,530,564 | Blaney | Nov. 21, 1950 |
| 2,764,733 | De Forest | Sept. 25, 1956 |

OTHER REFERENCES

Electronics article, December 1949, pages 78–83.